Jan. 19, 1926.
M. W. JONES
FISHING TOOL
Filed Nov. 20, 1922
1,570,065
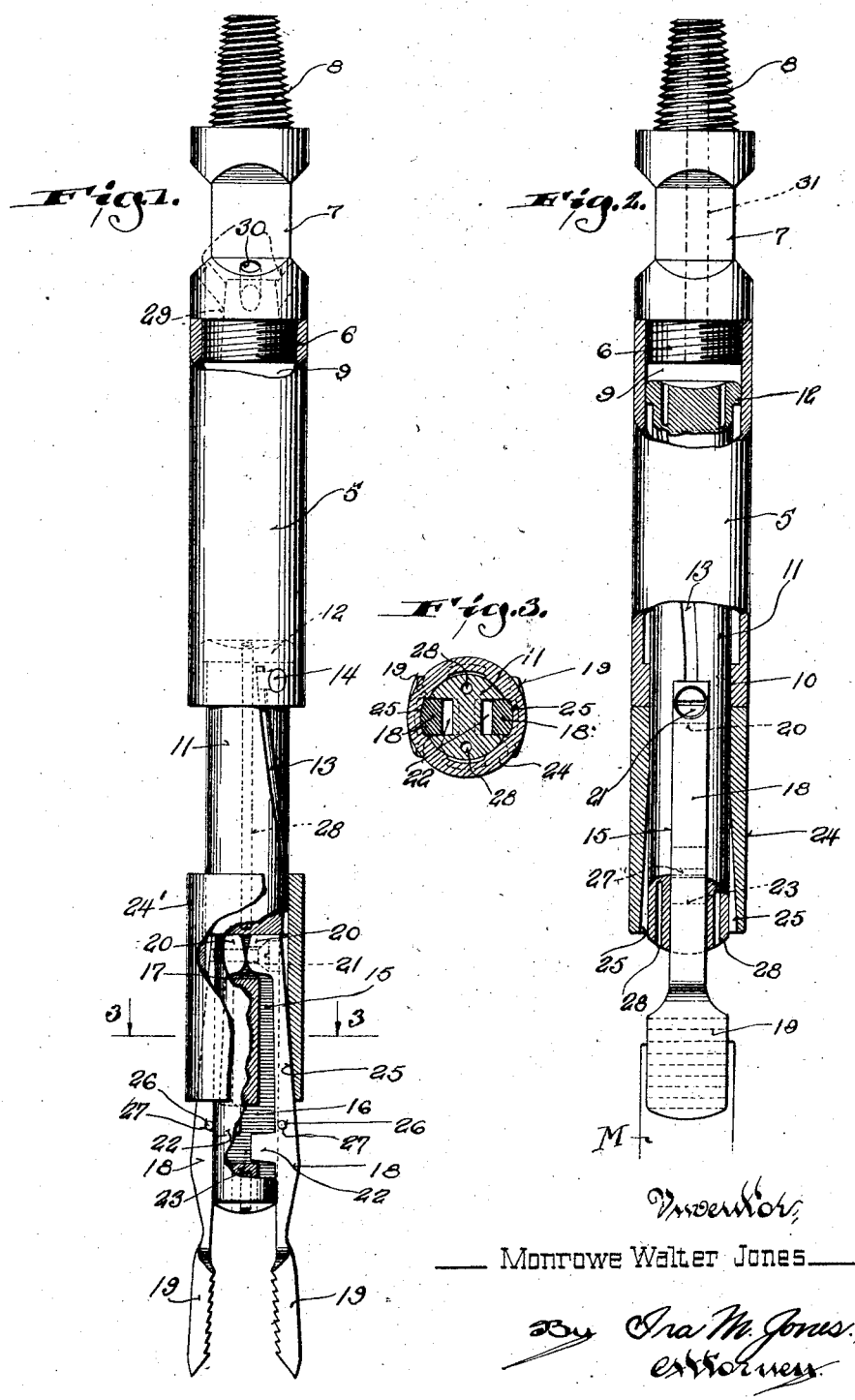
Inventor,
Monrowe Walter Jones
By Ira M. Jones.
Attorney Patented Jan. 19, 1926.

1,570,065

UNITED STATES PATENT OFFICE.

MONROWE WALTER JONES, OF ARDMORE, OKLAHOMA.

FISHING TOOL.

Application filed November 20, 1922. Serial No. 602,107.

*To all whom it may concern:*

Be it known that I, MONROWE WALTER JONES, a citizen of the United States, and resident of Ardmore, in the county of Carter and State of Oklahoma, have invented new and useful Improvements in Fishing Tools, of which the following is a description, reference being had to the accompanying drawings, which are a part of this specification.

This invention relates to certain new and useful improvements in well fishing tools of that type employed for retrieving or extracting lost pieces of metal or broken tools, such as underreamer lugs, broken bits, etc., from a well.

Numerous types of well fishing tools have been designed, all of which are open to many objections in that they are extremely complicated in construction and the gripping jaws thereof are dependable upon springs and are too weak to withstand the weight of a drill stem and are not readily secured over the member to be extracted from the well.

Having in mind the above and other objections inherent in the types of well fishing tools now employed, it is one of the objects of this invention to provide means for rotating the gripping jaws as they are engaged with the member to be extracted whereby the jaws are guided thereover prior to the gripping or locking engagement of the jaws therewith.

It is another object of my invention to provide a tool of the character described which, by reason of its design and construction, is reinforced at all points desirable in order to provide all available strength.

This invention has for a further object to provide means for positively retaining the gripping jaws in expanded or open position until the member to be extracted is positioned therebetween.

A still further object of this invention resides in the provision of means for permitting the passage of fluid past the tool whereby its employment in a well filled with liquid is unhindered.

And a still further object of this invention resides in the provision of a tool of the character described in which the parts thereof may be readily renewed and one in which any type of gripping jaws may be employed.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a side view, partly in section and partly in elevation, of a well fishing tool constructed in accordance with my invention, parts thereof being illustrated in the position they occupy when the gripping jaws are in open position;

Figure 2 is a view similar to Figure 1 illustrating the parts in the positions they occupy as the gripping jaws are being firmly locked or clamped about the member being retrieved or extracted, and Figure 3 is a transverse sectional view taken through Figure 1 on the line 3—3.

Referring now more particularly to the accompanying drawings, in which like numerals designate like parts throughout the several views, the numeral 5 designates a tubular post or shaft, the outer end of which is internally threaded to receive the threaded base 6 of a connecting portion 7 to the outer threaded end 8 of which is secured the operating member (not shown) for lowering the same into the well. The bore 9 of member 5 is slightly reduced in diameter at the lower and thereof, as at 10, and the shank or stem 11 of a plunger 12 mounted in bore 9 passes outwardly therethrough.

The shank or stem 11 has a spiral groove or channel 13 therein in which a pin or lug 14 carried by member 5 and extended in the reduced bore part 10 engages, whereby movement of the stem into and out of member 5 will tend to rotate the same.

The lower end of stem 11 is provided with two opposite longitudinally extended slots 15 having communicating passages or openings 16 and 17 in which the shank portions 18 of suitable gripping jaws 19 are secured. The ends of the gripping jaw shanks have lugs or projections 20 thereon which extend into opening 17 and are connected by a screw 21, the opening in one of the lugs, through which the screw passes, being of larger diameter than the screw shank to permit pivotal movement of the gripping jaws.

The gripping jaw shanks have lugs or projections 22 formed thereon intermediate of their ends for engagement in opening 16, said lugs being positioned so that when the gripping jaws are closed they pass one above the other and rest on a lug or projection 23 when the gripping jaws are engaged with the tool or other member M being extracted from the well.

Slidably mounted on stem 11 is a collar or sleeve 24', the interior of which is provided with longitudinal grooves or channels 25 adapted to receive the gripping jaw shanks. The grooves or channels are taperingly reduced whereby a cam or depressing action is produced on shanks 18 outwardly of their pivotal connection to close the gripping jaws.

As illustrated in Figure 1, the gripping jaws are normally held in extended or open position by pins 26 inserted through openings 27 in the gripping jaw shanks and engaging stem 11 at either side of the slots 15. The pins 26 resist movement of said shanks into slots 15 and are preferably constructed of wood, copper, or other material capable of being readily sheared between the walls of the slots and the sides of the gripping jaw shanks.

In operation, the tool is lowered into the well with the parts in the positions depicted in Figure 1, and as the ends of the jaws 19 contact with the member M to be retrieved or extracted, the stem comes to rest. A continued lowering of the tool-carrying member causes the member 5 to continue downwardly, pin 14 carried thereby working downwardly in the spiral groove 13 imparting a twist or turn to the gripping jaws to place the same over the upper end of member M.

By the time plunger 12 has moved into member 5 sufficiently to engage the lower end of said member with the upper end of sleeve 24', the upper end of member M will be positioned between the gripping jaws 19. The continued downward movement of member 5 will force sleeve 24 downwardly over the gripping jaw shanks closing the jaw members and shearing pins 26 to firmly clamp the gripping jaws about member M. By reason of the construction of the gripping jaws, any tendency of the jaws to spread is resisted by the sleeve 24' and thus the extraction of member M is made positive.

In order to provide for the flowing of fluid through my improved tool, stem 11 has suitable passages or openings 28 extended therethrough its entire length, and connection 7 is provided with a central bore or recess 29 in its inner end from which radiate outlets 30. In the event it is desired to employ my improved tool as means for operating in connection with rotary tools, where it is necessary to force water therethrough to clean out as is the custom in operating this system, the water is forced through a passage 31 in the center of connection 7 with which a suitable passage for the same communicates. This form of connection 7 is illustrated in Figure 2.

The passages or holes 30, in that form of connection 7 illustrated in Figure 1, are for the purpose of permitting the ready escapage of water, mud, or any other liquid or foreign matter from cylinder 9 so plunger 12 may freely travel its full stroke. The passages or holes 28 and 31, in that form of connection 7 illustrated in Figure 2, are for use in connection with rotary tools, other than cable tools, to provide a passage for a flushing stream of water which is forced to the bottom as the device is lowered to wash out the mud, etc.

What I claim as my invention is:

1. A device of the character described, comprising a tubular shaft member, a stem carried thereby and having a limited movement therein, said stem having a plurality of spaced, longitudinal slots in the outer end portion thereof, gripping members having their inner end portions disposed in said slots, means pivotally securing the inner ends of the gripping members to the stem, a sleeve slidably mounted on the stem intermediate the tubular shaft member and the gripping members, and a pin inserted through each gripping member outwardly of its pivot and resisting movement of the gripping members into said slots, said sleeve being movable over the inner end portions of the gripping members upon movement of the stem in said tubular shaft member a predetermined degree to force the gripping members into the slots shearing the pins.

2. A device of the class described, comprising a tubular shaft having a stem movable therein, said stem being moved upon its contact with the object to be removed, means for rotating said stem during its movement within said tubular shaft, gripping jaws carried by the stem, yielding elements for holding said jaws in an inactive position during their turning movement, and a member movable upon said stem upon its engagement with the tubular shaft for breaking said yielding elements and forcing said jaws into engagement with said object.

3. A device of the class described, comprising a tubular shaft and a stem slidable therein, said movement being controlled by the engagement of the stem with the object to be removed, gripping jaws carried by said stem, means for rotating said stem and the jaws carried thereby, yielding elements for holding said jaws in an inactive position, and a member movable upon said stem upon its engagement with the shaft for breaking said yielding elements and forcing said jaws into engagement with said object.

In testimony whereof I affix my signature.

MONROWE WALTER JONES.